March 7, 1939. A. F. W. RICHARDS ET AL 2,149,550
COUPLING FOR ELECTRICAL AND MECHANICAL PURPOSES
Filed July 25, 1935 3 Sheets-Sheet 1
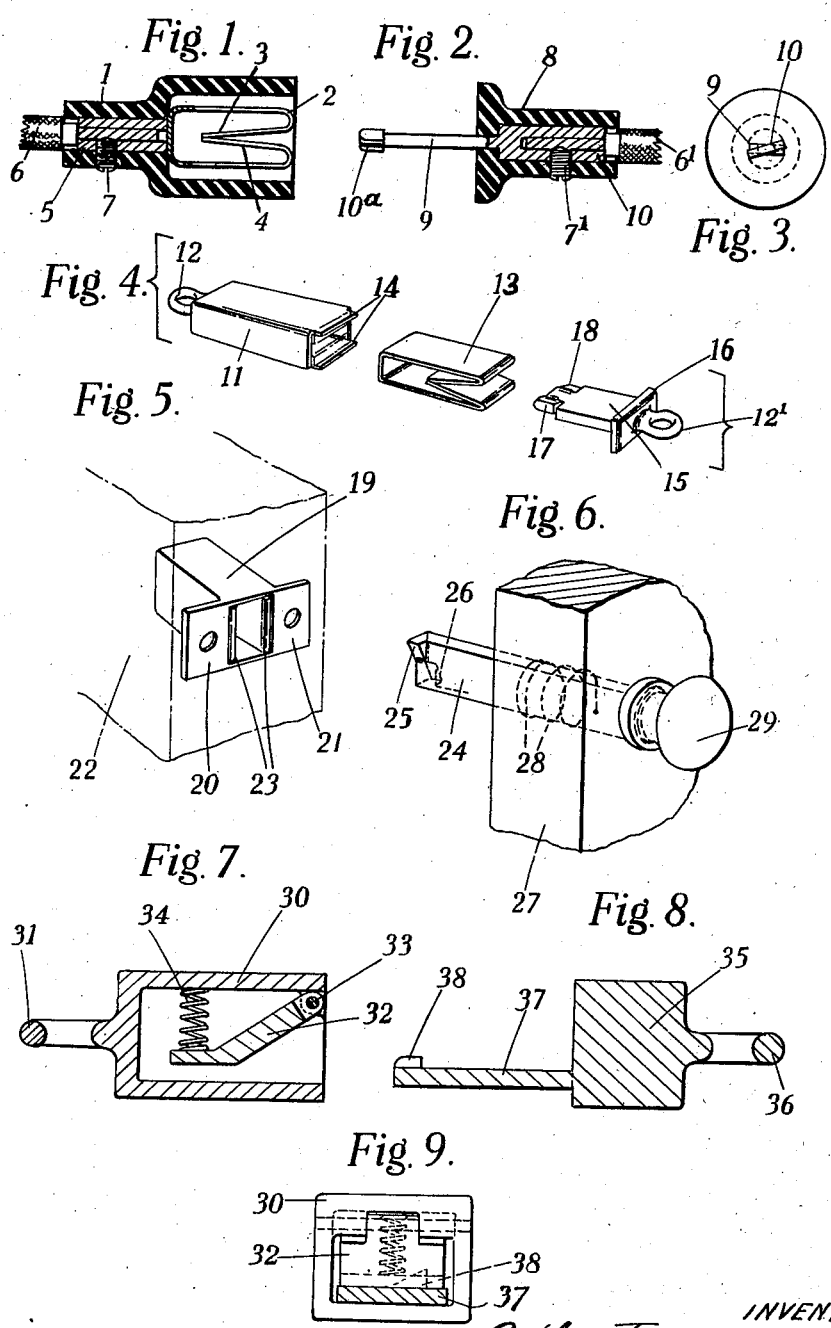

March 7, 1939.   A. F. W. RICHARDS ET AL   2,149,550
COUPLING FOR ELECTRICAL AND MECHANICAL PURPOSES
Filed July 25, 1935   3 Sheets-Sheet 2

INVENTORS.
Arthur Francis Ward Richards.
Harold Bright.
BY
Stone, Boyden & Mack.
ATTORNEYS

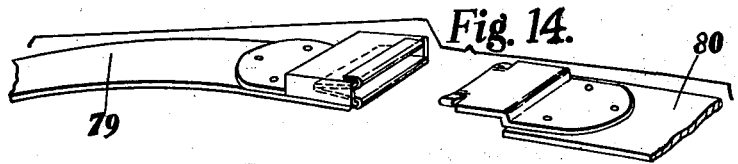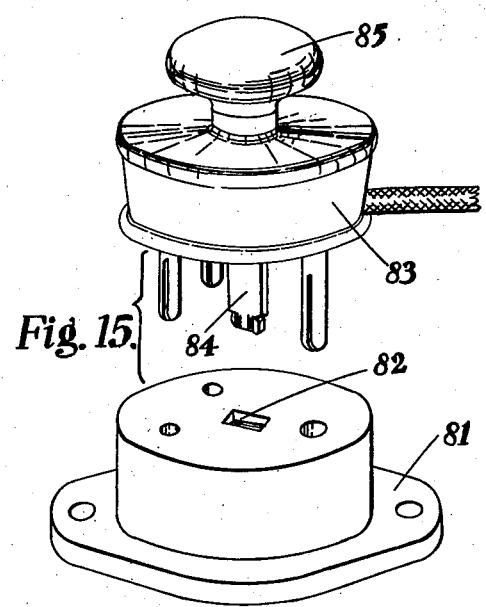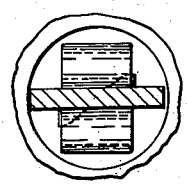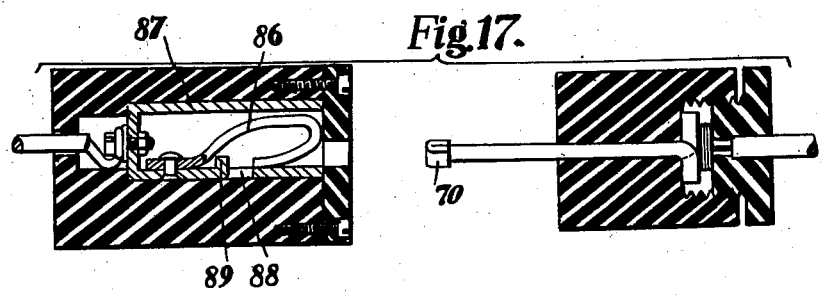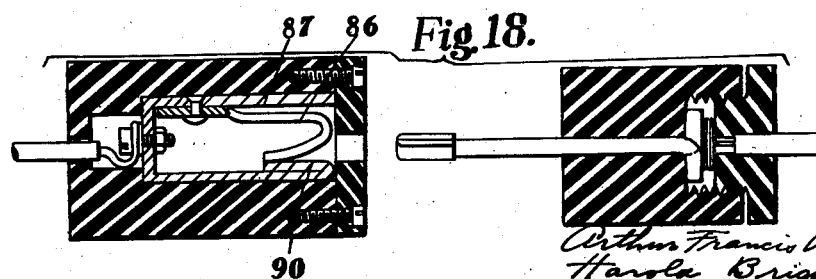

Patented Mar. 7, 1939

2,149,550

UNITED STATES PATENT OFFICE 2,149,550

COUPLING FOR ELECTRICAL AND MECHANICAL PURPOSES

Arthur Francis Ward Richards and Harold Bright, London, England

Application July 25, 1935, Serial No. 33,174
In Great Britain July 30, 1934

12 Claims. (Cl. 24—230)

The present invention relates to mechanical and electrical couplings.

It is an object of the present invention to provide a coupling or catch which can be readily engaged or dis-engaged but which will not readily pull apart in actual use.

It is also an object of the invention to provide a coupling which will be self-engaging to lock the parts thereof together.

Furthermore, it is an object of the invention to provide a coupling for electrical purposes which will provide a good electrical contact, simultaneously with a mechanical locking of the contacting parts.

Still another object of the invention is to provide an electrical coupling which will readily engage to lock the contacting parts together, but which can be readily disengaged.

A still further object of the invention is to provide an electrical coupling which will automatically lock the contacting parts together, but which may readily be disengaged.

Other objects of the invention will appear as the description thereof proceeds.

The invention is applicable to a very large number of purposes and is capable of execution in a large number of different forms.

In carrying out the present invention a coupling for electrical or mechanical purposes is provided comprising a member having a socket containing a laterally resilient detent adapted to press upon a male member to be inserted in said socket, said male member having a stop or stops projecting therefrom and adapted to pass beyond the detent whereby the male member is held within the socket against withdrawal, the male member, however, being so formed as to permit of disengaging the said detent to release the coupling. The male member may be in the form of a tongue adapted when slightly turned on its axis to move the detent out of the path of the stop or stops on the tongue. To this end the tongue is of relatively wide, flattened form, at least in the portion thereof adjacent the stop or stops. The stop or stops project from the flat face or faces of the tongue to a height which is relatively small as compared with the width of the tongue, and usually extend transversely for only a portion of the width of the tongue. Preferably, and as shown in the accompanying drawings, each stop lies wholly on one side only of a plane passing through the central or longitudinal axis of the tongue at right angles to the flat faces thereof, and is thus disposed only adjacent a narrow lateral edge thereof.

The resilient detent within the socket may be in the form of an inwardly directed resilient leaf adapted to press upon the tongue or like male member inserted in the socket, and the stop or stops on the tongue will then engage behind the inner end of the said resilient leaf. Alternatively the resilient detent may comprise a pair of these members pressing one upon the other so that the tongue may be inserted between them, the tongue being of flat form whereby it may be turned to move the leaf members apart so releasing the stop or stops on the tongue from engagement with the leaf members.

The coupling may comprise a member having a socket containing an inwardly directed resilient leaf member and a tongue adapted to enter the socket between one wall thereof and the said leaf member. A stop is provided on the tongue on the side thereof against which the leaf member presses, adapted to engage behind the inner end of the said leaf member. The tongue is again of flat form adjacent the stop, where it engages the leaf member whereby it may be turned through a small angle to move the leaf member out of the path of the stop. In this form of the invention an aperture may be provided in the wall against which the tongue is pressed by the leaf member and a stop provided on the tongue on that side thereof will then be able to drop into said aperture and so provide a holding means either in addition to or in place of the stop which engages behind the inner end of the resilient leaf. A coupling device according to the invention may moreover be made extensible or adjustable in length by providing a series of stops placed at intervals along the tongue member.

In order that the invention may be more clearly understood, a number of embodiments thereof will now be described with reference to the accompanying drawings, in which:

Fig. 1 shows a socket member suitable for use as an electrical coupling.

Fig. 2 is a tongue adapted to engage in the socket shown in Fig. 1.

Fig. 3 is an end view of the tongue member shown in Fig. 2.

Fig. 4 is an exploded view of a coupling suitable for use as a necklet fastener.

Fig. 5 is the socket member and

Fig. 6 the tongue member of a fastening suitable for use as a door catch.

Fig. 7 is a socket member and

Fig. 8 a tongue of a mechanical coupling for heavy loads.

Fig. 9 is an end view of the socket shown in

Fig. 7 with the tongue in position and shown in section.

Figure 10:
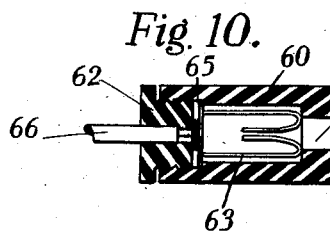

Fig. 10 shows another form of socket member for a single pole electrical conductor.

Figure 11:
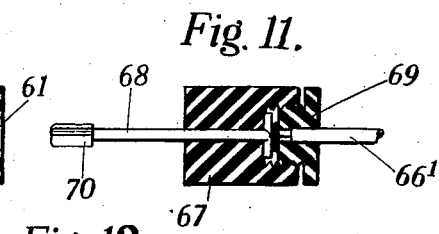

Fig. 11 shows a tongue member for engagement with the socket shown in Fig. 10.

Figure 12:
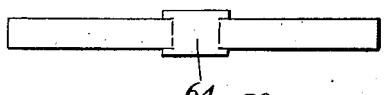

Fig. 12 shows in developed form the resilient leaf member of the socket shown in Fig. 10.

Figure 13:
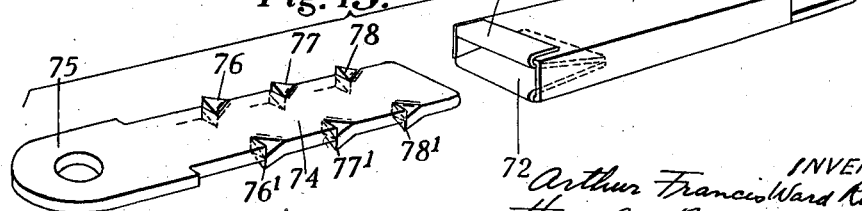

Fig. 13 shows the two parts of an adjustable mechanical fastening according to the invention.

Fig. 14 shows the two parts of a coupling suitable for use as a belt fastening.

Fig. 15 shows the invention applied to an electrical plug and socket coupling.

Fig. 16 illustrates a principle of construction which may advantageously be employed in carrying the invention into effect.

Fig. 17 shows in section the socket of another form of single pole electrical coupling and a tongue for engagement therewith.

Fig. 18 shows a modification of the coupling shown in Fig. 17.

Referring first to Fig. 1 the socket member of the coupling comprises an insulating body 1 having an open ended portion of enlarged diameter in which is contained the leaf spring member 2 which is in the form of a strip of phosphor-bronze or like metal bent into the shape of a U with the limbs of the U bent inwardly back upon themselves so that they press one upon the other at their inner ends 3 and 4. This leaf spring member is attached to a brass or the like metal lining 5 which is in the form of a sleeve adapted to receive a conductor 6 which is held therein by means of a grub screw 7. The tongue member shown in Fig. 2 comprises a moulded insulating body 8 in which is embedded the relatively wide, flat tongue 9 the end of which is twisted at 10 to form a pair of stops projecting in opposite directions from the faces of the tongue at opposite side edges thereof. Within the body 8, the tongue merges into a tubular bush 11 constituting a sleeve in which the conductor 6' may be secured by means of a grub screw 7'. The shape of the portion 10 at the end of the tongue 9 may be seen more clearly from Fig. 3.

The necklace fastener shown in Fig. 4 comprises a box portion 11 which is provided at one end with a ring 12 by which it may be attached to a necklace and is adapted to contain the spring member 13 which corresponds to the spring member 2 in Fig. 1 and which may be held within the box 11 by turning down the ears 14 which project from the sides of the box. The ears 14 moreover ensure that the tongue inserted in the socket will be guided into the centre between the two springs. Otherwise it might be possible to insert the tongue between the back of the spring member and the side of the box and this would not, of course, provide the locking action according to the invention. The necklace fastener as shown comprises a flat tongue member 15 provided at one end with a shoulder portion 16 and a ring 12' by which it may be attached to a necklace, the leading end being provided with locking lugs 17 and 18 turned respectively up and down at opposite sides so as to constitute stops.

In the catch or fastening shown in Fig. 5 a socket member is provided comprising a box 19 having ears 20 and 21 by which it may be fastened to a door jamb shown in dotted lines at 22. Within the box member is provided a double U-shaped spring of substantially the form shown in Fig. 10, but in this case shown in the vertical position. To co-operate with this socket member there is mounted on the door a tongue member 24 provided with teeth or lugs 25 and 26 projecting at opposite corners on opposite sides of the tongue. Each of these lugs is shown as extending only about one-half the width of the tongue. The tongue member is housed in the edge of the door 27 and is normally urged into the upright position, for instance by means of a spring 28. The catch may be operated by a handle 29 on the outside of the door. The socket member shown in Fig. 7 may be employed as a mechanical coupling member for heavy duty and comprises a box-like portion 30 provided with a ring or the like 31 for attachment to a chain or some such article to be coupled to another. The box is rectangular in form and contains a detent member 32 which projects inwardly from a hinge 33 provided along one edge of the box member. The detent member 32 is urged towards the opposite side of the box member by a spring 34 which may be of any form and is shown in this embodiment as a coil spring.

A tongue for engagement with the coupling shown in Fig. 7 is shown in Fig. 8. This comprises a body portion 35 from which projects on one side a ring 36 and on the other side the tongue member 37 provided at its leading end and adjacent one side edge with a tooth 38 constituting a stop. As can be seen from Fig. 9 when the tongue is inserted in the socket the resilient spring-urged detent member 32 falls into place behind the tooth 38 so locking the tongue against withdrawal from the device. The tongue may, however, be released by twisting the tongue member in the clockwise direction, as viewed in Fig. 9, the left-hand edge of the wide, flat tongue lifting the detent 32 out of engagement with the tooth 38. Thus it will be seen that the lifting edge is spaced from the tooth or stop, or, in other words, that the stop preferably does not extend entirely to the lifting edge of the tongue. Again, where the stop is bevelled or inclined, as shown here and in several of the other figures, it will be noted that its highest point is most remote from the lifting edge. This is for the purpose of reducing to a minimum the angle through which it is necessary to turn the tongue in order to release the stop.

The coupling shown in Figs. 10, 11 and 12 is a simple form of single pole electrical coupling which may conveniently be made by moulding the insulating parts. The socket member shown in Fig. 10 comprises a hollow body 60 having an opening 61 at one end and being closed at the other end by a screw cap 62. Contained within the body is the double spring member 63 which is shown in developed form in Fig. 12. The widened portion 64 of the spring member engages a shoulder 65 provided in the insulating body and the spring member is thereby held in position. The connection of the electrical conductor 66 to the socket is made by passing the wire through the cap 62 and bending the bare end into a rough coil. When the cap 62 is then screwed into position in the socket member, the coiled end of the wire 66 is pressed against the transverse portion of the spring member 63 and electrical contact thereby effected. The wire is, moreover, firmly held within the coupling by this means. The plug member 70 as shown in Fig. 11 comprises a body portion 67 through which projects a tongue member 68 which is divided at its inner end and the two parts spread apart to form a shoulder which prevents the tongue pulling completely through the body member. The body member 67 is closed by a cap 69. The conductor 66′ passes through the cap 69 and is connected to the tongue in the same manner as the conductor 66 is connected to the spring 63, namely by forming the end into a rough coil and clamping same between the plug 69 and the shoulder formed on the tongue 68. The leading end of the tongue 68 is provided with stop members by twisting the end portion as at 70 in the manner above described.

The coupling shown in Fig. 13 comprises a tubular portion 71 which is provided at its leading end with inturned spring members 72 constituting the resilient detent according to the invention. At the other end, the tube is provided with a tag 73 by which the tube may be fastened to a strap or other device to be coupled. The tongue portion comprises a blade member 74 provided at one end with a tab 75 constituting the fastening means. Pairs of stops 76 76′, 77 77′ etc. are provided at intervals along the tongue, and project upwardly and downwardly at opposite edges of the tongue. In operation the tongue is inserted into the tube to the required distance whereupon the springs 72 engage behind the appropriate pair of stops to prevent withdrawal of the tongue until the latter is turned to release the stops from the spring. This form of coupling is useful for harness and such purposes.

The embodiment shown in Fig. 14 is an embodiment suitable for use as a belt fastener. It is operated similarly to the previously described embodiments but for this purpose the tongue and socket are preferably made wider, and it will be seen that each stop clearly lies wholly on one side only of the longitudinal axis. The two parts are shown attached to the ends of two flexible strips to be coupled together.

In Fig. 15 a hand shield plug and socket connection of conventional type is shown embodying the invention. It comprises a socket member 81 in which are provided three sockets adapted to receive the three pins of a three-pin plug and an additional socket 82 in the centre, which contains resilient detent members according to the invention. The plug member shown at 83 comprises in addition to the three pins of the conventional plug a central tongue 84 provided with struck-up lugs at its leading end. This tongue is adapted to enter the socket 82 and lock therein by the method according to the invention. The tongue 84 is connected mechanically to the knob 85 of the plug member and this knob is attached to the body of the plug so as to be rotatable relatively thereto. The tongue may then be turned by the knob to release the plug from the socket.

Fig. 16 shows in end view a socket with a tongue in position therein. It will be seen from this figure that the tongue is substantially the same width as the diameter of cross-section of the socket. By making the tongue and socket in this way, the socket provides sufficient clearance for the tongue to be turned, without allowing the tongue to rock sideways in either direction.

The embodiment shown in Fig. 17 is a single pole electrical connector comprising a tongue member of the type above described. The socket member in this embodiment however comprises a single spring member 86 riveted to one side of an enclosing metal box 87. Provided in the side of the metal box 87 is an aperture 88. The material from the aperture 88 forms the struck-up lug 89 which serves as a limit stop to limit the extent to which the tongue may be inserted in the socket. The outer end of the aperture 88 is in alignment with the inner end of the inturned portion of the spring 86. When the tongue is inserted in such a socket the stops on the tongue which project in opposite directions engage respectively behind the inner end of the spring or resilient detent 86 and over the edge of the aperture 88, which latter constitutes a fixed detent. Thus while in previous modifications a pair of detents are provided, both of which are resilient, in the present case one of the detents is resilient while the other is fixed. In this embodiment a good electrical contact is obtained, since the tongue lies flat upon the lower wall of the box 87 and is pressed thereagainst by the spring 86, and firm mechanical locking is obtained since the stop on the tongue engages the rigid edge of the aperture 88.

Finally, Fig. 18 shows a slightly modified form of the socket shown in Fig. 17. In this embodiment, in place of the aperture 88, an edge is formed by turning back a strip 90 projecting from the end of the lower wall of the box 87. A further modification is also shown in this embodiment, the spring 86 in this case being riveted to the upper wall of the box 87 instead of to the lower wall.

It will be understood of course that the invention is capable of many variations from the examples above described. For instance many other ways of making the tongue and socket members are possible. For instance an alternative method of making the stop on the tongue is to make two longitudinal cuts from the end of the strip adjacent the opposite sides and to bend back the two end portions of the strip so formed through an angle of not less than 90°. Alternatively the stops may be in the form of lugs struck up from the body of the tongue.

Other constructions of socket are also possible. For example the socket may be in the form of a tube of oblong or oval cross section, the normal cross section of the tube being of such a shape that when the tongue is inserted the walls of the socket are distorted by forcing out the side walls to increase the short cross section of the tube and at the same time decrease the long cross section of same. Detents may be formed either by actually adding material to the walls of the tube or by embossing an internal projection. Alternatively, tongues may be cut from the walls of the tube and bent backwards until the end portions lie flat against one another or nearly so as in the re-entrant U-shaped spring above described. The projection or projections or the tongue or tongues may be first stamped from the material of the tube and the tube subsequently bent up.

As shown in the examples the socket member may be embedded in insulating material. For instance it may be let into a porcelain body or a moulded body of synthetic resin or the like.

Many purposes may be found for the invention when applied to electrical couplings, one important example being for the plug and socket connections used in radio receiving sets for instance for connecting the aerial and earth. The socket may then be arranged on the set and the tongue or tongues on the lead wires.

The invention may also be applied to electric lamps for instance by providing tongue contacts with stops on the lamp adapted to enter sockets with resilient detents on the lamp holder, or vice versa. The bayonet socket type of coupling for electric incandescent lamps is subject to the drawback that the electrical contact between spring plungers in the lamp holder and contact surfaces on the lamp cap is sometimes imperfect and heat develops owing to contact-resistance when the lamp is in operation. The springs deteriorate owing to the heating and result in the electrical contact becoming worse. Much better contact is made with the tongue and socket method of this invention which is especially useful for high power lamps. Thermionic valves, photoelectric cells and other devices and caps for these devices and electric lamps having tongue contacts of the kind above described also fall within the ambit of the invention.

Another application of the invention in the field of electrical couplings is to sparking plugs. In this embodiment of the invention the terminal on the top of a sparking plug may be in the form of a tongue according to the invention. The socket may then be fixed on the lead wire to be attached to the sparking plug and connection may then readily be made to the tongue provided on the plug. A neat coupling is thus obtained which has the advantage that it may be readily connected and disconnected while at the same time it cannot be dislodged by mechanical vibration.

The invention may also be applied to such articles as stocking or sock suspenders. It will ordinarily be most convenient to provide a tongue on each end of an elastic tape, the length of which can be varied by means of a buckle, and to provide sockets on the stockings and corset or other supporting garment. The sockets may be provided with spring clasps or other means for detachably connecting them to the garment. For this application the sockets are made small and thin so as to be almost invisible and may be covered with a thin casing of india rubber.

The invention may be applied to disconnecting collar studs, for example, the socket may be secured to or made integral with the base of the stud and the tongue to the top of the stud.

We claim:

1. A coupling of the class described, comprising a member having a socket, a resilient detent carried by said member within said socket, a male member adapted to enter said socket and rotatable therein about its longitudinal axis and at least one stop projecting transversely from said male member adapted to engage behind said detent, that portion of said male member adjacent said stop being of relatively wide, flat cross-section and in contact with said detent and said stop being spaced from one edge of said member and of relatively small height as compared with the width of said member, whereby said member when twisted about its longitudinal axis moves the detent clear of said stop.

2. A coupling of the class described comprising a member having a socket, a tongue having a flat face and adapted to enter said socket and to rotate therein about its longitudinal axis, an inwardly directed resilient leaf carried by said member within said socket and adapted to press upon the flat face of the tongue, and a stop on said tongue lying substantially on one side only of a plane passing through said longitudinal axis at right angles to said flat face, said stop being relatively low as compared with the width of said tongue and adapted to engage behind the inner end of said resilient leaf, whereby, when said tongue is twisted about its longitudinal axis, it moves the resilient leaf out of the path of said stop.

3. A coupling of the class described comprising a member having a socket, a pair of resilient inwardly directed leaf members within said socket, a tongue adapted to enter said socket between said leaf members with the faces of said tongue in engagement with said members, and a pair of stops on the leading end of said tongue adapted to engage behind the inner ends of said leaf members, the tongue being of flat form and said stops projecting from opposite faces thereof adjacent the side edges only, each face having one stop only, whereby said tongue may be turned to separate the leaf members and release the same from the stops provided on the tongue.

4. A coupling of the class described comprising a member having a socket, one wall of which is flat, an aperture in said wall, a resilient leaf member within said socket, inwardly directed with its inner free end terminating adjacent said aperture, a flat tongue adapted to enter said socket between said resilient leaf member and said flat wall, and stops on said tongue projecting from opposite faces adjacent opposite side edges only so as to engage respectively behind the inner end of said resilient leaf and within said aperture to hold said tongue in the socket.

5. A coupling of the class described comprising a member having a socket, a pair of inwardly directed leaf members within said socket extending towards one another and a tongue adapted to enter said socket between said resilient leaf members, said tongue comprising a flat strip having oppositely struck-up lugs at the opposite side edges only of its leading end to engage behind the inner ends of said leaf members when the tongue is inserted in the socket.

6. A coupling of the class described comprising a member having a socket, a pair of detents within said socket, at least one of which is resilient, a tongue member adapted to enter said socket between said detents, said tongue member being in the form of a flat strip, the leading end of which is provided with cut portions twisted out of the plane of the body of the tongue at the sides to provide complementary oppositely directed stops on the leading end of said tongue to engage with said detents.

7. A coupling of the class described comprising a socket member having a pair of detents, at least one of which is resilient, and a plug member having a tongue insertable endwise into said socket member between and in contact with said detents, and provided with a locking lug projecting transversely therefrom and adapted to pass beyond and engage one of said detents, said tongue adjacent said lug being of relatively wide flat form, and said lug being relatively low as compared with the width of said tongue and being spaced a substantial distance from one of the narrow side edges of the tongue, whereby a turning of the tongue about its longitudinal axis through an angle substantially less than 90° serves to move said detents apart and thus release said lug.

8. A coupling of the class described comprising a socket member having a pair of detents, at least one of which is resilient, and a plug member having a tongue insertable endwise into said socket member between and in contact with said detents, said tongue and one of said detents having interlocking parts one of which is adapted to pass beyond and engage with the other, and said tongue adjacent its said interlocking part being relatively wide and flat as compared with its thickness, and said interlocking part being spaced a substantial distance from one of the narrow side edges of the tongue, whereby a turning of the tongue about its longitudinal axis through an angle substantially less than 90° serves to move said detents apart and thus release said interlocking part.

9. A coupling of the class described comprising a plug member having a relatively wide flat tongue provided adjacent its narrow edge only with a locking lug projecting from its face to a height which is relatively small as compared with the width of said tongue, and a socket member having a fixed detent and a resilient leaf member associated therewith, said tongue being insertable endwise into said socket member between said detent and leaf member and in contact with said leaf member, said locking lug being arranged to pass beyond said fixed detent and be urged laterally into engagement with it by said leaf member when the tongue is inserted into the socket member, said lug being releasable from said detent by a turning movement of said tongue about its longitudinal axis through an angle substantially less than 90°, against the tension of said leaf member.

10. A coupling of the class described comprising a member having a socket, a resilient detent carried by said member within said socket, a male member adapted to enter said socket and rotatable therein about its longitudinal axis, said male member having a flat surface adapted to engage said detent, and a stop projecting from said flat surface spaced from one narrow edge thereof and adapted to engage behind said detent, whereby the male member may be withdrawn from said socket after twisting it about its longitudinal axis to clear said stop from said detent.

11. A coupling of the class described comprising a member having a socket, a resilient member fixed therein and having a free end, a tongue adapted to enter said socket with one surface thereof in engagement with said resilient member and to rotate therein about its longitudinal axis, and a lug projecting from the said surface of the tongue adapted to engage behind the free end of the resilient member to lock the tongue within the socket, the said lug having a transversely bevelled upper edge, the highest portion of the lug being relatively low as compared with the width of the tongue and being substantially at that point thereof which is most remote from one side edge of the tongue, that portion of said tongue which engages said resilient member being of flat form, whereby when twisted about its longitudinal axis it displaces said resilient member out of the path of said lug.

12. A coupling of the class described, comprising a member having a socket, a resilient member fixed therein and having a free end, a tongue adapted to enter said socket with a portion thereof in engagement with said resilient member and to rotate therein about its longitudinal axis, that portion of said tongue which engages said resilient member being of flat form, and a stop projecting from the flat face of the tongue adjacent its side edge only adapted to engage behind the free end of the resilient member to lock the tongue within the socket, said stop being of a height less than the width of the tongue, whereby when the tongue is twisted about its longitudinal axis it displaces said resilient member out of the path of said stop.

ARTHUR FRANCIS WARD RICHARDS.
HAROLD BRIGHT.